United States Patent
Lee et al.

(10) Patent No.: US 12,517,665 B2
(45) Date of Patent: Jan. 6, 2026

(54) VOLATILE MEMORY DEVICE

(71) Applicant: Samsung Electronics Co., Ltd., Suwon-si (KR)

(72) Inventors: Jae Pil Lee, Seoul (KR); Kwang Sook Noh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 413 days.

(21) Appl. No.: 18/049,001

(22) Filed: Oct. 24, 2022

(65) Prior Publication Data

US 2023/0141221 A1     May 11, 2023

(30) Foreign Application Priority Data

Nov. 10, 2021   (KR) .................. 10-2021-0153886

(51) Int. Cl.
| | |
|---|---|
| *G06F 3/06* | (2006.01) |
| *G11C 5/02* | (2006.01) |
| *G11C 11/4097* | (2006.01) |
| *G11C 11/4091* | (2006.01) |

(52) U.S. Cl.
CPC .......... *G06F 3/0626* (2013.01); *G06F 3/0629* (2013.01); *G06F 3/0673* (2013.01); *G11C 5/025* (2013.01); *G11C 11/4097* (2013.01); *G11C 11/4091* (2013.01)

(58) Field of Classification Search
CPC ................................ G06F 3/0626; G06F 3/06
USPC .......................................... 365/51
See application file for complete search history.

(56) References Cited

U.S. PATENT DOCUMENTS

| | | | |
|---|---|---|---|
| 6,370,054 B1* | 4/2002 | Fujisawa | G11C 11/4097 365/230.03 |
| 6,898,109 B2* | 5/2005 | Hirose | H10B 12/50 257/E21.656 |
| 7,499,340 B2 | 3/2009 | Kajigaya et al. | |
| 8,665,625 B2 | 3/2014 | Narui | |
| 8,976,563 B2* | 3/2015 | Iida | G11C 5/06 365/72 |
| 9,396,776 B2 | 7/2016 | Yang | |
| 2001/0028593 A1* | 10/2001 | Sekiguchi | G11C 11/4097 365/230.03 |

FOREIGN PATENT DOCUMENTS

| | | |
|---|---|---|
| KR | 10-2015-0064950 A | 6/2015 |
| KR | 10-2017-0022652 A | 3/2017 |
| KR | 10-2017-0022653 A | 3/2017 |

\* cited by examiner

*Primary Examiner* — Muna A Techane
(74) *Attorney, Agent, or Firm* — Harness, Dickey & Pierce, P.L.C.

(57) ABSTRACT

A memory such as a volatile memory device capable of having a reduced area is provided. The volatile memory device comprises a first sense amplifier, a second sense amplifier spaced apart from the first sense amplifier, a first normal mat disposed between the first sense amplifier and the second sense amplifier, and including a first bit line connected to the first sense amplifier and a second bit line connected to the second sense amplifier, and a first reference mat disposed on the first normal mat between the first sense amplifier and the second sense amplifier, and including a first complementary bit line connected to the first sense amplifier and a second complementary bit line connected to the second sense amplifier.

20 Claims, 19 Drawing Sheets

VOLATILE MEMORY DEVICE

CROSS-REFERENCE TO RELATED APPLICATION

This application claims priority from Korean Patent Application No. 10-2021-0153886 filed on Nov. 10, 2021 in the Korean Intellectual Property Office, and all the benefits accruing therefrom under 35 U.S.C. § 119, the contents of which in its entirety are herein incorporated by reference.

BACKGROUND

Some example embodiments relate to a volatile memory device, and more particularly, to a volatile memory device having an open bit line structure.

A semiconductor memory device for storing data may be broadly divided into a volatile memory device and a non-volatile memory device. Ina volatile memory device, such as a dynamic random access memory (DRAM) in which data is stored by charging or discharging a cell capacitor, stored data is maintained while power is applied to the volatile memory device, but the stored data is lost when power is cut off. Meanwhile, a non-volatile memory device may store data even when power is cut off. The volatile memory device is mainly used as a main memory of a computer and the like, and the non-volatile memory device is used as a massive memory for storing programs and data in a wide range of application devices, such as computers and portable communication devices.

The volatile memory device may have an open bit line structure or a folded bit line structure. A sense amplifier of the volatile memory device having the above-mentioned structures may have a pair of bit lines corresponding to each other. The volatile memory device having the open bit line structure may include an unnecessary mat according to characteristics of the structure thereof.

SUMMARY

Some example embodiments provide a memory device such as a volatile memory device capable of having a reduced area.

Alternatively or additionally, some example embodiments provide a memory device such as a volatile memory device capable of having an increased cell density.

However, aspects of example embodiments are not restricted to those set forth herein. The above and other aspects of example embodiments will become more apparent to one of ordinary skill in the art by referencing the detailed description given below.

According to some example embodiments, there is provided a volatile memory device capable of having a reduced area. The volatile memory device comprises a first sense amplifier, a second sense amplifier spaced apart from the first sense amplifier, a first normal mat between the first sense amplifier and the second sense amplifier and including a first bit line connected to the first sense amplifier and a second bit line connected to the second sense amplifier, and a first reference mat on the first normal mat between the first sense amplifier and the second sense amplifier, and including a first complementary bit line connected to the first sense amplifier and a second complementary bit line connected to the second sense amplifier.

According some example embodiments, there is provided a memory device such as a volatile memory device comprising a first sense amplifier, a second sense amplifier and a third sense amplifier that are sequentially spaced apart from the first sense amplifier in a first direction, a first mat between the first sense amplifier and the second sense amplifier, and including a first bit line connected to the first sense amplifier and a second bit line connected to the second sense amplifier, a second mat on the first mat between the first sense amplifier and the second sense amplifier, and including a first complementary bit line connected to the first sense amplifier, and a third mat between the second sense amplifier and the third sense amplifier, and including a second complementary bit line connected to the second sense amplifier.

According to some example embodiments, there is provided a memory device such as a volatile memory device comprising a plurality of memory banks, a row decoder having a first memory bank of the plurality of memory banks, the first row decoder extending in a first direction, a column decoder extending in a second direction orthogonal to the first direction, a bank memory array arranged in the second direction from the row decoder and arranged in the first direction from the column decoder, and a first sense amplifier at a first edge portion of the bank memory array in a third direction opposite to the first direction, wherein the bank memory array includes a first normal mat spaced apart from the first sense amplifier in the first direction and including a first bit line connected to the first sense amplifier, and a first reference mat spaced apart from the first normal matin the third direction, and including a first complementary bit line connected to the first sense amplifier.

According to some example embodiments, there is provided a memory device such as a volatile memory device comprising a first sense amplifier, a second sense amplifier spaced apart from the first sense amplifier in a first direction, a first bit line connected to the first sense amplifier between the first sense amplifier and the second sense amplifier and extending in the first direction, a first metal line connected to the first sense amplifier and extending in a second direction intersecting the first direction, a first complementary bit line spaced apart from the first bit line in the second direction and connected to the first sense amplifier through the first metal line, a second bit line connected to the second sense amplifier between the first sense amplifier and the second sense amplifier and extending in the second direction, and a plurality of word lines extending in a third direction intersecting the first direction and the second direction between the first sense amplifier and the second sense amplifier and connected to the first bit line, the first complementary bit line, and the second bit line.

BRIEF DESCRIPTION OF THE DRAWINGS

The above and other aspects and features will become more apparent by describing in detail various example embodiments thereof with reference to the attached drawings, in which.

DETAILED DESCRIPTION OF VARIOUS EXAMPLE EMBODIMENTS

Hereinafter, example embodiments will be described with reference to the attached drawings.

Figure 1:
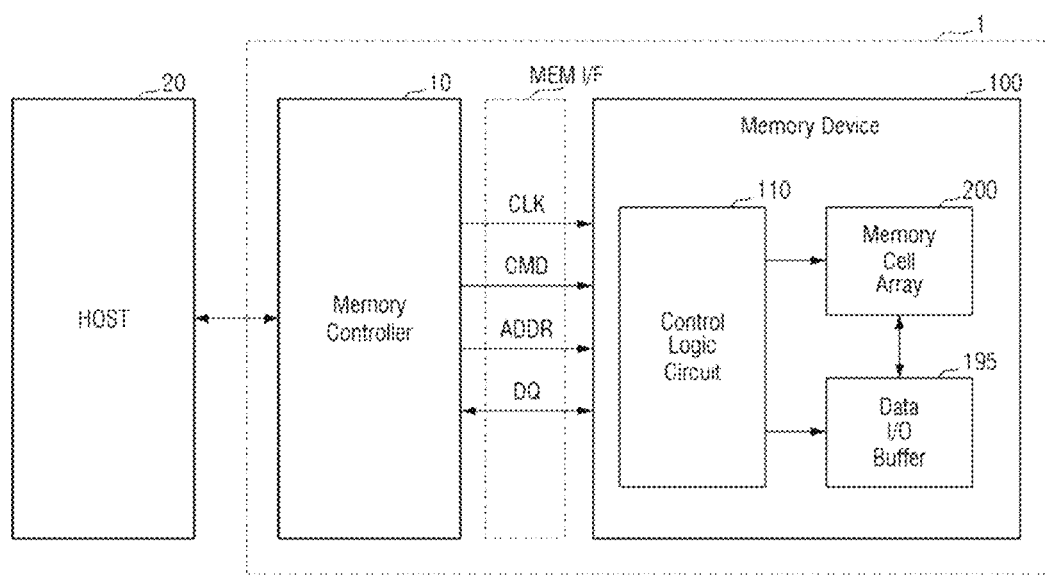
FIG. 1 is a block diagram illustrating a memory system according to some example embodiments.

FIG. 1 is a block diagram illustrating a memory system according to some example embodiments.

Referring to FIG. 1, the memory system may include a host device 20 and a memory storage device 1. The memory storage device 1 may include a memory device 100 and a memory controller 10.

The memory controller 10 may control an overall operation of the memory device 100. For example, the memory controller 10 may control data exchange between the external host device 20 and the memory device 100. For example, the memory controller 10 may control the memory device 100 according to a request from the host device 20, and may write data and/or read data through such control.

The memory controller 10 and the memory device 100 may communicate through a memory interface MEM 1/F. Alternatively or additionally, the memory controller 10 and the external host device 20 may communicate through a host interface. For example, the memory controller 10 may mediate a signal between the memory device 100 and the host device 20. The memory controller 10 may control the operation of the memory device 100 by applying a command CMD for controlling the memory device 100 to the memory device 100. Here, the memory device 100 may include dynamic memory cells. For example, the memory device 100 may include one or more of a dynamic random access memory (DRAM), a double data rate 4 (DDR4) synchronous DRAM (SDRAM), a low power DDR4 (LPDDR4) SDRAM, or an LPDDR5 SDRAM. However, example embodiments are not limited thereto, and the memory device 100 may include a non-volatile memory device. However, in various example embodiments, the memory device 100 will be described as a volatile memory device.

The memory controller 10 may transmit a clock signal CLK, a command CMD, an address ADDR, and the like to the memory device 100. The memory controller 10 may provide data DQ to the memory device 100 and receive data DQ from the memory device 100. The memory device 100 may include a memory cell array 200 in which the data DQ is stored, a control logic circuit 110, a data input/output buffer 195, and the like.

Figure 2:
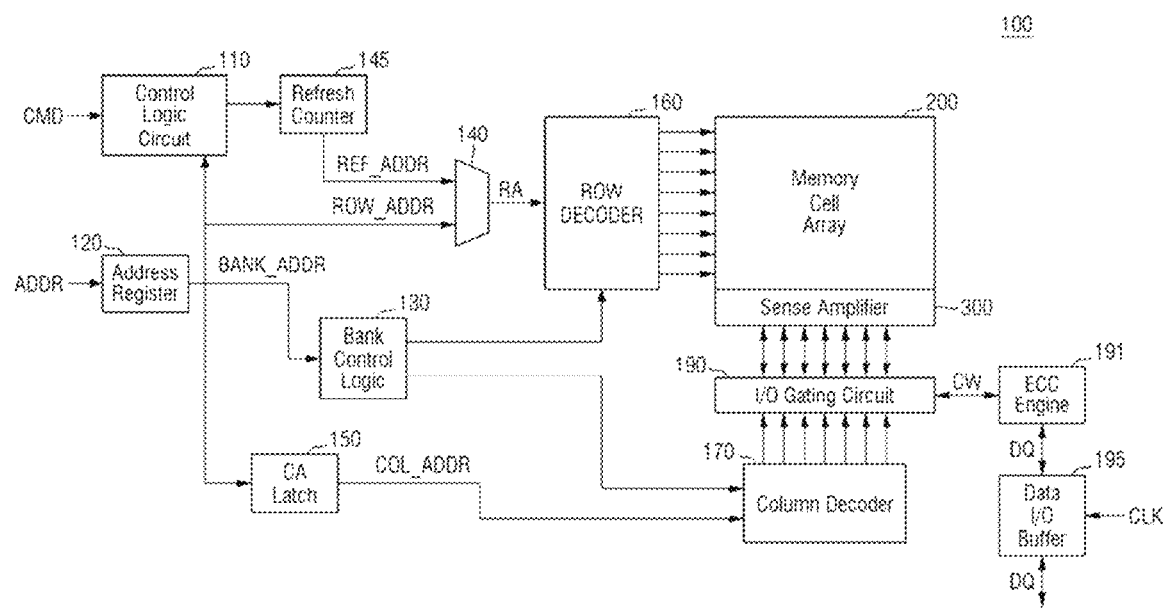
FIG. 2 is a block diagram of the memory device of FIG. 1.

FIG. 2 is a block diagram of the memory device of FIG. 1.

Referring to FIG. 2, the memory device 100 may include a control logic circuit 110, an address register 120, a bank control logic circuit 130, a row address multiplexer 140, a refresh counter 145, a column address latch 150, a row decoder 160, a column decoder 170, a memory cell array 200, a sense amplifier 300, an input/output gating circuit 190, an ECC engine 191, a data input/output buffer 195, and the like.

The memory cell array 200 may include a plurality of bank arrays. The row decoder 160 may be connected to the plurality of bank arrays. The column decoder 170 may be connected to the plurality of bank arrays. The sense amplifier 300 may be respectively connected to the plurality of bank arrays. The memory cell array 200 may include a plurality of word lines, a plurality of bit lines, and a plurality of memory cells formed at intersections of the word lines and the bit lines.

The address register 120 may receive an address ADDR from the memory controller 10. The address ADDR may include a bank address BANK_ADDR, a row address ROW_ADDR, a column address COL_ADDR, and/or the like. The address register 120 may provide the bank address BANK_ADDR to the bank control logic circuit 130. The address register 120 may provide the row address ROW_ADDR to the row address multiplexer 140. The address register 120 may provide the column address COL_ADDR to the column address latch 150.

The bank control logic circuit 130 may generate a bank control signal in response to the bank address BANK_ADDR. The bank row decoder 160 may be activated in response to the bank control signal. Alternatively or additionally, the column decoder 170 may be activated in response to the bank control signal corresponding to the bank address BANK_ADDR.

The mw address multiplexer 140 may receive a row address ROW_ADDR from the address register 120, and may receive a refresh row address REF_ADDR from the refresh counter 145. The row address multiplexer 140 may select one of the row address ROW_ADDR and the refresh row address REF_ADDR and output the selected one as a row address RA. The row address RA may be transmitted to the row decoder 160.

The refresh counter 145 may sequentially output the refresh row address REF_ADDR according to the control of the control logic circuit 110.

The row decoder 160 activated by the bank control logic circuit 130 may decode the row address RA output from the row address multiplexer 140 to activate a word line corresponding to the row address RA. For example, the row decoder 160 may apply a word line driving voltage to the word line corresponding to the row address RA.

The column address latch 150 may receive the column address COL_ADDR from the address register 120 and temporarily store the received column address COL_ADDR. The column address latch 150 may gradually increase the received column address COL_ADDR in or during a burst mode. The column address latch 150 may provide the temporarily stored column address COL_ADDR or the gradually increased column address COL_ADDR to the column decoder 170.

Among the column decoders 170, the column decoder 170 activated by the bank control logic circuit 130 may activate the sense amplifier 300 corresponding to the bank address BANK_ADDR and the column address COL_ADDR through the corresponding input/output gating circuit 190.

The input/output gating circuit 190 may include a circuit for gating input/output data, input data mask logic, read data latches for storing data output from the memory cell array 200, and write drivers for writing data into the memory cell array 200.

A codeword CW read from the bank array of the memory cell array 200 may be sensed by the sense amplifier 300 corresponding to the bank array. Alternatively or additionally, the codeword CW may be stored in the read data latch. The ECC engine 191 may perform ECC decoding on the codeword CW stored in the read data latch, and the data DQ on which the ECC decoding is performed may be provided to the memory controller 10 through the data input/output buffer 195.

The data input/output buffer 195 may provide the data DQ to the ECC engine 191 based on the clock signal CLK in or during a write operation. The data input/output buffer 195 may provide the data DQ provided from the ECC engine 191 to the memory controller 10 based on the clock signal CLK in a read operation.

The memory cell array 200 may be connected to the sense amplifier 300, and the row decoder 160 and the column decoder 170 may be connected to the memory cell array 200 and the sense amplifier 300. In this case, the plurality of bit lines included in the memory cell array 200 may be connected to the sense amplifier 300 in an open bit line structure. This will be described in more detail.

Figure 3:
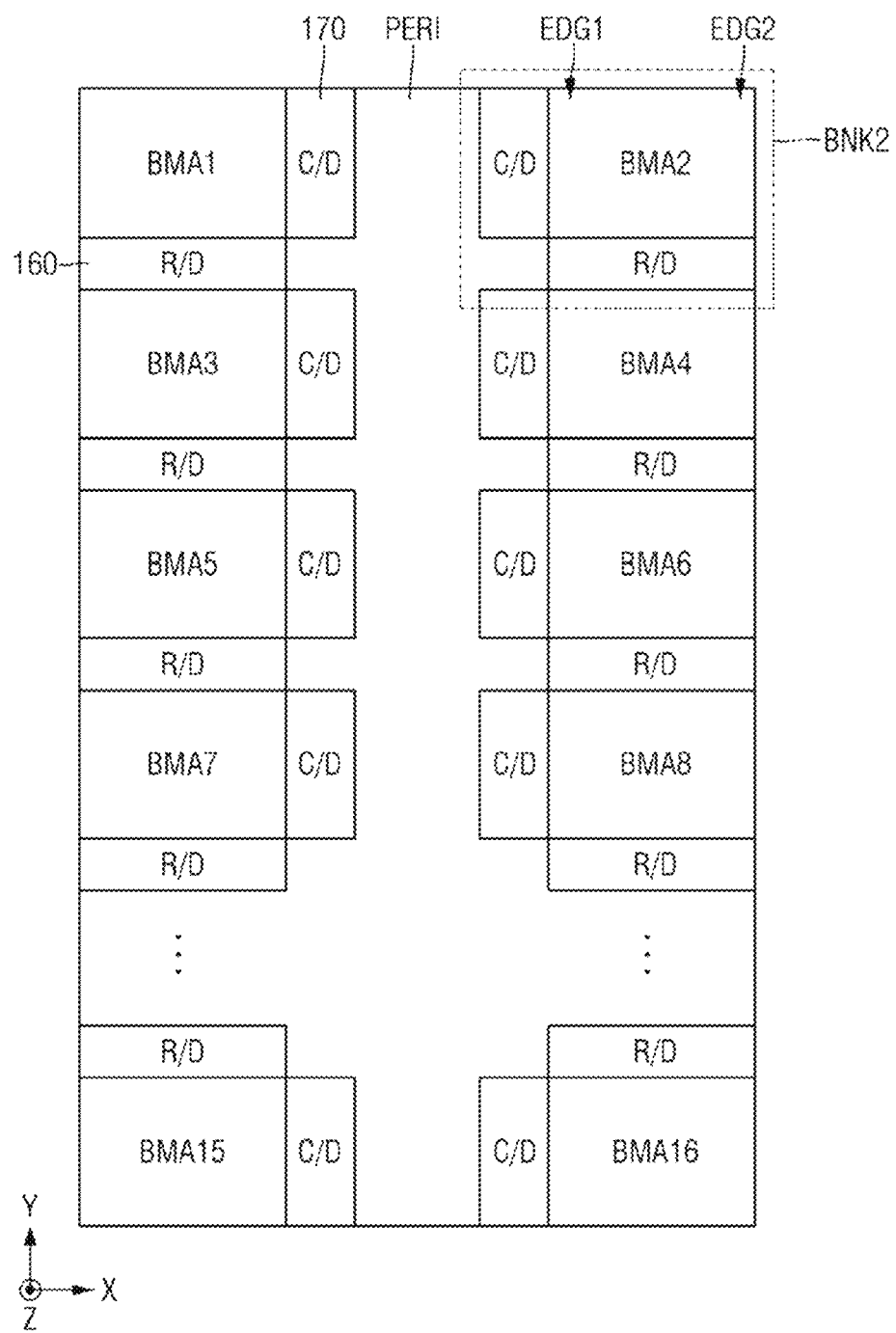
FIG. 3 is a plan view of a memory device according to some example embodiments.

FIG. 3 is a plan view of a memory device according to some example embodiments.

Referring to FIG. 3, the memory device 100 may include a plurality of bank memory arrays BMA1 to BMA16, a row decoder 160, a column decoder 170, and a peripheral circuit region PERI.

In some example embodiments, the memory device 100 may be disposed on a plane extending in a first direction X and a second direction Y. For example, the memory device 100 may extend in the first direction X and the second direction Y. In some example embodiments, the memory device 100 may have a rectangular shape when viewed from the top.

The memory device 100 may include sixteen bank memory arrays BMA1 to BMA16. Here, the sixteen bank memory arrays BMA1 to BMA16 may process 1 Gb of data. However, example embodiments are not limited thereto, and the memory device 100 may include a different number of bank memory arrays BMA1 to BMA16. The bank memory arrays BMA1 to BMA16 may be regularly arranged. For example, the first, third, fifth, seventh, ninth, eleventh, thirteenth, and fifteenth bank memory arrays BMA1, BMA3, BMA5, BMA7, BMA9, BMA11, BMA13, and BMA15 may be sequentially arranged along a direction opposite to the second direction Y. and the second, fourth, sixth, eighth, tenth, twelfth, fourteenth, and sixteenth bank memory arrays BMA2, BMA4, BMA6, BMA8, BMA10, BMA12, BMA14, and BMA16 may be sequentially arranged along a direction opposite to the second direction Y. Alternatively or additionally, the second, fourth, sixth, eighth, tenth, twelfth, fourteenth, and sixteenth bank memory arrays BMA2, BMA4, BMA6, BMA8, BMA10, BMA12, BMA14, and BMA16 may be spaced apart in the first direction X from the first, third, fifth, seventh, ninth, eleventh, thirteenth, and fifteenth bank memory arrays BMA1, BMA3, BMA5, BMA7, BMA9, BMA11, BMA13, and BMA15.

The row decoder 160 may extend in the first direction X and may be disposed between the plurality of bank memory arrays BMA1 to BMA16. For example, the row decoder 160 may be disposed between the first bank memory array BMA1 and the third bank memory array BMA3. The column decoder 170 may extend in the second direction Y, and may be disposed at one side of the plurality of bank memory arrays BMA1 to BMA16. For example, the column decoder 170 may be disposed in the first direction X from the first bank memory array BMA1. Alternatively or additionally, the row decoder 160 may intersect the column decoder 170. Alternatively or additionally, the plurality of bank memory arrays BMA1 to BMA16 may be surrounded by the row decoder 160 and the column decoder 170.

The peripheral circuit region PERI may be disposed in a portion of the memory device 100 except for the plurality of bank memory arrays BMA1 to BMA16, the row decoder 160, and the column decoder 170. Here, the peripheral circuit region PERI may include the control logic circuit 110, the address register 120, the bank control logic circuit 130, the row address multiplexer 140, the refresh counter 145, the column address latch 150, the input/output gating circuit 190, the ECC engine 191, and the data input/output buffer 195 of FIG. 2.

Here, one of the bank memory arrays BMA1 to BMA16 may include the memory cell array 200 and a part of the sense amplifier 300, but example embodiments are not limited thereto. One of the bank memory arrays BMA1 to BMA16 may include a first edge portion EDG1 and a second edge portion EDG2. For example, the second bank memory array BMA2 may include a first edge portion EDG1 in a direction opposite to the first direction X and a second edge portion EDG2 in the first direction X.

The memory bank may be defined by one of the bank memory arrays BMA1 to BMA16, one row decoder 160, and one column decoder 170. For example, a second memory bank BNK2 may be defined by the second bank memory array BMA2, the row decoder 160, and the column decoder 170. Here, the memory bank may correspond to a storage unit indicating one bank address.

Figure 4:
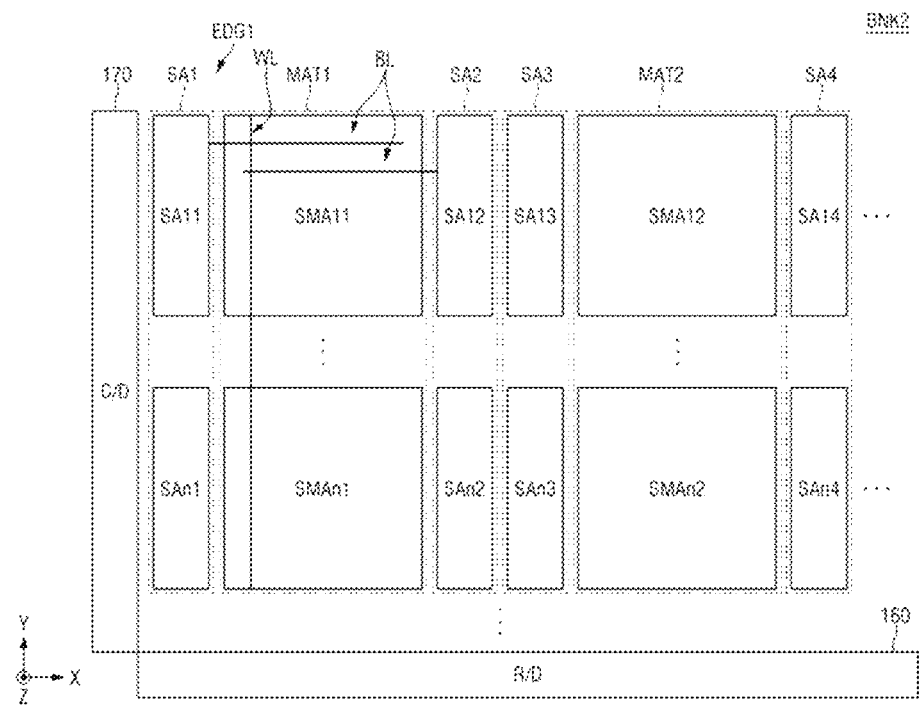
FIGS. 4 and 5 are enlarged views of the second memory bank of FIG. 3.
Figure 5:
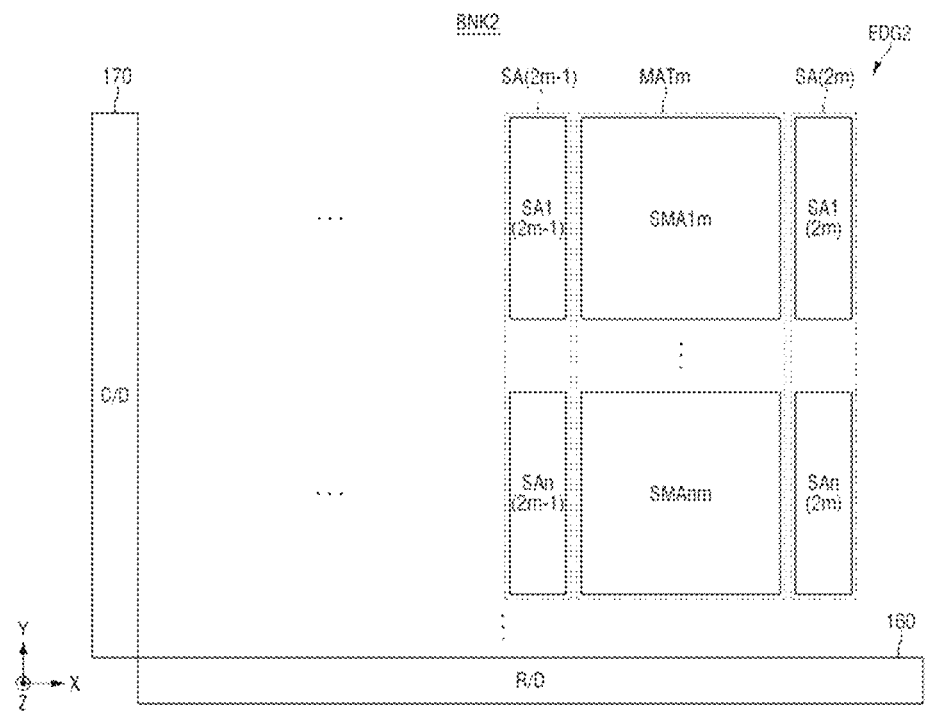

FIGS. 4 and 5 are enlarged views of the second memory bank of FIG. 3.

Referring to FIGS. 4 and 5, the second memory bank BNK2 may include a row decoder 160, a column decoder 170, and a second bank memory array BMA2 surrounded by the row decoder 160 and the column decoder 170. Here, the second bank memory array BMA2 may include a plurality of sense amplifiers SA1 to SA(2m) and a plurality of mats MAT1 to MATm.

The plurality of mats MAT1 to MATm may be disposed between the plurality of sense amplifiers SA1 to SA(2m). For example, the first mat MAT1 may be disposed between the first sense amplifier SA1 and the second sense amplifier SA2. Alternatively or additionally, the m-th mat MATm may be disposed between the (2m−1)-th sense amplifier SA(2m−1) and the (2m)-th sense amplifier SA(2m). As used herein, a mat may include a cell array in which each cell is connected to a word line and a bit line. The mat may also include column and/or word line drivers connected to the word lines. For example, a mat may be or may include one or more subarrays of cells. The plurality of mats MAT1 to MATm and the plurality of sense amplifiers SA1 to SA(2m) may extend in the second direction Y.

Each of the sense amplifiers SA1 to SA(2m) may include a plurality of sub sense amplifiers arranged in the second direction Y. For example, the first sense amplifier SA1 may include first sub sense amplifiers SA11 to SAn1 arranged in the second direction Y. Alternatively or additionally, the second sense amplifier SA2 may include second sub sense amplifiers SA12 to SAn2, the third sense amplifier SA3 may include third sub sense amplifiers SA13 to SAn3, and the fourth sense amplifier SA4 may include fourth sub sense amplifiers SA14 to SAn4. Alternatively or additionally, the (2m−1)-th sense amplifier SA(2m−1) may include (2m−1)-th sub sense amplifiers SA1(2m−1) to SAn(2m−1)), and the (2m)-th sense amplifier SA(2m) may include (2m)-th sub sense amplifiers SA1(2m) to SAn(2m).

Each of the mats MAT1 to MATm may include a plurality of sub-memory arrays arranged in the second direction Y. For example, the first mat MAT1 may include first sub-memory arrays SMA11 to SMAn1 arranged in the second direction Y, the second mat MAT2 may include second sub-memory arrays SMA21 to SMAn2, and the m-th mat MATm may include m-th sub-memory arrays SMA1$m$ to SMAnm.

In some example embodiments, the plurality of mats MAT1 to MATm and the plurality of sense amplifiers SA1 to SA(2m) may be formed in units of memory. For example, the first mat MAT1, the first sense amplifier SA1, and the second sense amplifier SA2 may be formed in units of single memory. For example, the first and second sense amplifiers SA1 and SA2 may perform a write or read operation on memory cells included in the first mat MAT1. The first and second sense amplifiers SA1 and SA2 may be connected to the bit lines BL included in the first mat MAT1 and read a voltage applied thereto, or apply a voltage to the bit lines BL.

Alternatively or additionally, a word line WL included in the first mat MAT1 may be connected to the column decoder 170 or the peripheral circuit region PER1, and the column decoder 170 may select a memory cell by applying a voltage to the word line WL. Here, the bit line BL and the word line WL may intersect each other. The memory cell may be formed between the bit line BL and the word line WL.

Alternatively or additionally, in some example embodiments, the plurality of sub-memory arrays SMA11 to SMAnm and the plurality of sub sense amplifiers SA11 to SAn(2m) may be formed in units of memory. For example, the first sub-memory array SMA11, the first sub sense amplifier SA11, and the second sub sense amplifier SA12 may be formed in units of single memory. For example, the first sub sense amplifier SA11 and the second sub sense amplifier SA12 may perform a write and/or read operation on memory cells included in the first sub-memory array SMA11.

In some example embodiments, the first sense amplifier SA1 may be disposed on the first edge portion EDG1, and the (2m)-th sense amplifier SA(2m) may be disposed on the second edge portion EDG2. For example, the first sense amplifier SA1 may be positioned in a region closest to the column decoder 170 in the second bank memory array BMA2, and the (2m)-th sense amplifier SA(2m) may be positioned in a region farthest from the column decoder 170 in the second bank memory array BMA2. Hereinafter, the sense amplifiers SA1 to SA(2m) and the mats MAT1 to MATm will be described in more detail with reference to FIGS. 6 to 9. FIGS. 6 to 9 describe the first sense amplifier SA1, the second sense amplifier SA2, and the first mat MAT1, but the description may be equally applied to other sense amplifiers SA3 to SA(2m) and mats MAT2 to MATm.

Figure 6:
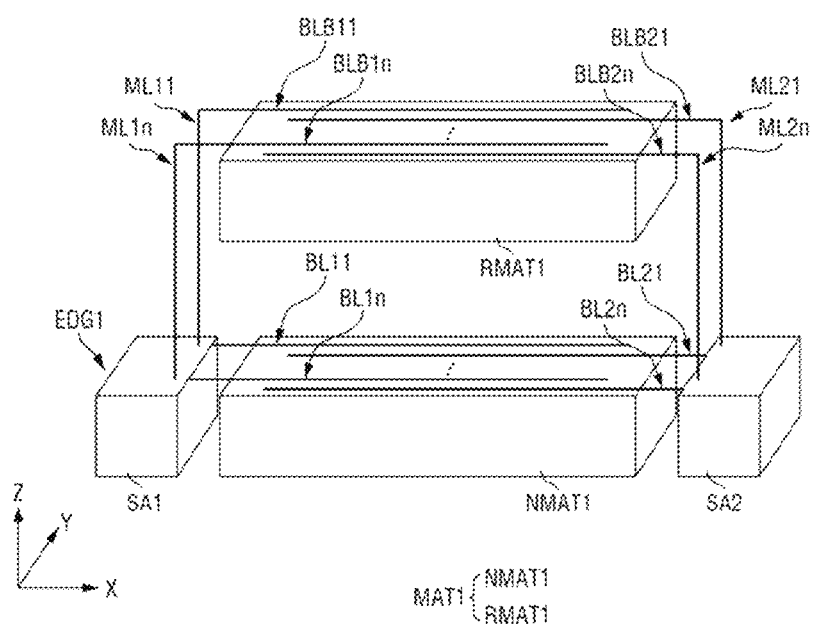
FIG. 6 is a three-dimensional view of the memory device according to some example embodiments.
Figure 7:
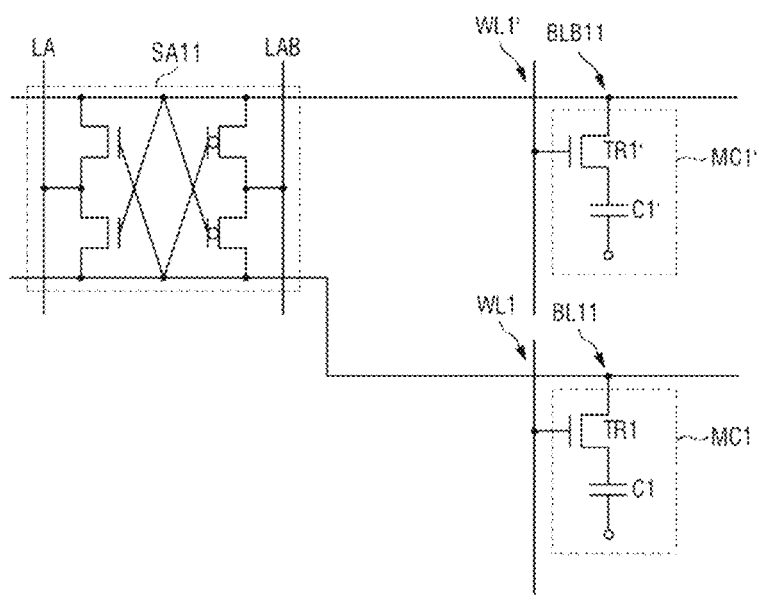
FIG. 7 is a circuit diagram of a sense amplifier and a plurality of memory cells of FIG. 6.
Figure 8:
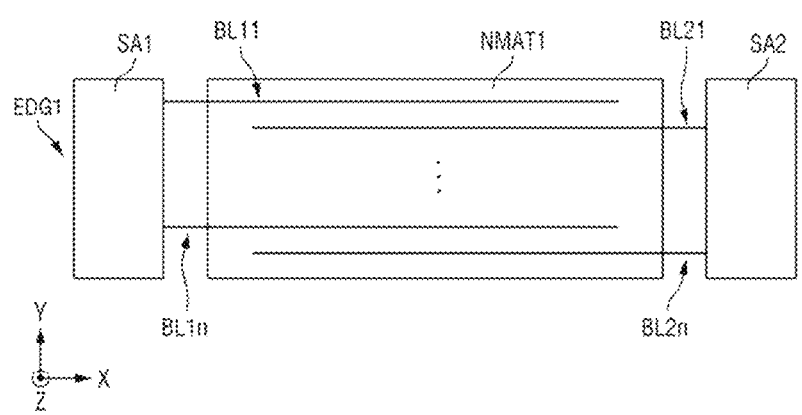
FIG. 8 is a top view of a first normal mat of a first layer of FIG. 6.
Figure 9:
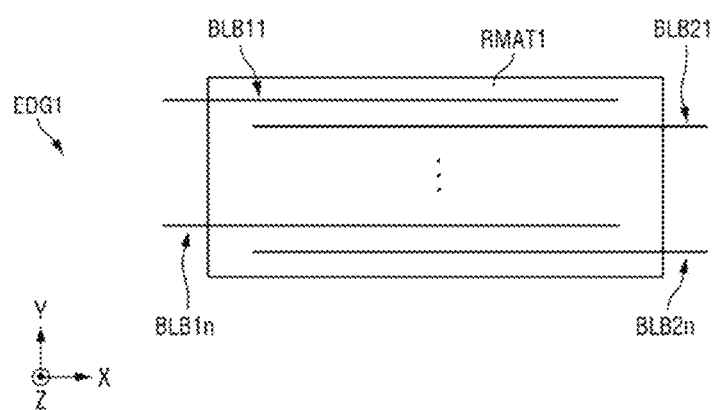
FIG. 9 is a top view of a first reference mat of a second layer of FIG. 6.

FIG. 6 is a three-dimensional view of the memory device according to some example embodiments. FIG. 7 is a circuit diagram of a sense amplifier and a plurality of memory cells of FIG. 6. FIG. 8 is a top view of a first normal mat of a first layer of FIG. 6. FIG. 9 is a top view of a first reference mat of a second layer of FIG. 6.

Referring to FIG. 6, the memory device 100 may include the first sense amplifier SA1, the second sense amplifier SA2, and the first mat MAT1. Here, the first sense amplifier SA1 may include the plurality of first sub sense amplifiers SA11 to SAn1 described with reference to FIG. 4, and the second sense amplifier SA2 may include a plurality of second sub sense amplifiers SA12 to SAn2. Alternatively or additionally, the first mat MAT1 may include a plurality of first sub-memory arrays SMA11 to SMAn1. Alternatively or additionally, the first mat MAT1 may include a first normal mat NMAT1 and a first reference mat RMAT1.

The first sense amplifier SA1 may extend in the second direction Y, and the second sense amplifier SA2 may extend in the second direction Y. Alternatively or additionally, the second sense amplifier SA2 may be disposed to be spaced apart from the first sense amplifier SA1 in the first direction X. Although the first and second sense amplifiers SA1 and SA2 in FIG. 6 are expressed as a rectangular parallelepiped, such a shape is merely an example, and example embodiments are not limited thereto. The first sense amplifier SA1 may be disposed at the first edge portion EDG1. For example, the first sense amplifier SA1 may extend along the first edge portion EDG1.

The first normal mat NMAT1 of the first mat MAT1 may be disposed between the first sense amplifier SA1 and the second sense amplifier SA2. For example, the first normal mat NMAT1 may be disposed on the same plane as the first and second sense amplifiers SA1 and SA2. For example, the first normal mat NMAT1 may be disposed on a substrate on which the first and second sense amplifiers SA1 and SA2 are positioned. Although the first normal mat NMAT1 is expressed as a rectangular parallelepiped, example embodiments am not limited thereto.

The first reference mat RMAT1 of the first mat MAT1 may be disposed above the first normal mat NMAT1. For example, the first reference mat RMAT1 may be disposed to be spaced apart from the first normal mat NMAT1 in a third direction Z. Here, the third direction Z may correspond to a direction intersecting both the first direction X and the second direction Y. The first reference mat RMAT1 may be positioned above the first normal mat NMAT1, the first sense amplifier SA1, and the second sense amplifier SA2. For example, the first normal mat NMAT1, the first sense amplifier SA1, and the second sense amplifier SA2 may be disposed on a first layer of the bank memory array, and the first reference mat RMAT1 may be disposed on a second layer of the bank memory array. The first reference mat RMAT1 may be positioned on a different substrate from the substrate on which the first normal mat NMAT1, the first sense amplifier SA1, and the second sense amplifier SA2 are disposed.

The first normal mat NMAT1 may include first to n-th bit lines BL11 to BL1$n$ and first to n-th bit lines BL21 to BL2$n$. The first to n-th bit lines BL11 to BL1$n$ may be connected to the first sense amplifier SA1, and the first to n-th bit lines BL21 to BL2$n$ may be connected to the second sense amplifier SA2. The first to n-th bit lines BL11 to BL1$n$ and the first to n-th bit lines BL21 to BL2$n$ may extend in the first direction X.

The first to n-th bit lines BL11 to BL1$n$ and the first to n-th bit lines BL21 to BL2$n$ may be spaced apart from each other in the second direction Y. For example, the first to n-th bit lines BL11 to BL1n may be spaced apart from each other in the second direction Y, and the first to n-th bit lines BL21 to BL2n may also be spaced apart from each other in the second direction Y. The first to n-th bit lines BL11 to BL1n and the first to n-th bit lines BL21 to BL2n may be alternately disposed or arranged. For example, the first bit line BL11 may be disposed to be spaced apart from the first bit line BL2l in the second direction Y. and the n-th bit line BL1n may be disposed to be spaced apart from the n-th bit line BL2n in the second direction Y.

Although not illustrated in FIG. 6, the first normal mat NMAT1 may include a plurality of word lines intersecting the first to n-th bit lines BL11 to BL1n and the first to n-th bit lines BL21 to BL2n. In addition, the plurality of memory cells may be connected between the first to n-th bit lines BL11 to BL1n and the first to n-th bit lines BL21 to BL2n, and the plurality of word lines.

The first reference mat RMAT1 may include first to n-th complementary bit lines BLB11 to BLB1n and first to n-th complementary (or barred) bit lines BLB21 to BLB2n. The first to n-th complementary bit lines BLB11 to BLB1n may be connected to the first sense amplifier SA1, and the first to n-th complementary bit lines BLB21 to BLB2n may be connected to the second sense amplifier SA2. The first to n-th complementary bit lines BLB11 to BLB1n and the first to n-th complementary bit lines BLB21 to BLB2n may extend in the first direction X.

The first to n-th complementary bit lines BLB11 to BLB1n and the first to n-th complementary bit lines BLB21 to BLB2n may be spaced apart from each other in the second direction Y. Alternatively or additionally, the first to n-th complementary bit lines BLB11 to BLB1n and the first to n-th complementary bit lines BLB21 to BLB2n may be alternately disposed.

Although not illustrated in FIG. 6, the first reference mat RMAT1 may include a plurality of word lines intersecting the first to n-th complementary bit lines BLB11 to BLB1n and the first to n-th complementary bit lines BLB21 to BLB2n. Alternatively or additionally, the plurality of memory cells may be connected between the first to n-th complementary bit lines BLB11 to BLB1n and the first to n-th complementary bit lines BLB21 to BLB2n, and the plurality of word lines.

First to n-th metal lines ML1 to ML1n may extend in the third direction Z. The first to n-th metal lines ML11 to ML1n may connect the first sense amplifier SA1 and the first to n-th complementary bit lines BLB1 to BLB1n. For example, the first to n-th metal lines ML11 to ML1n may connect the first sense amplifier SA1 and the first reference mat RMAT1. The first sense amplifier SA1 and the first reference mat RMAT1 may be three-dimensionally connected through the first to n-th metal lines ML11 to ML1n. Accordingly, the memory device 100 including the first normal mat NMAT1 and the first reference mat RMAT1 may have a plurality of stack memory structure, such as a two-stack memory structure.

The first sense amplifier SA1 may be connected to all of the first to n-th bit lines BLi1 to BL1n included in the first normal mat NMAT1 and the first to n-th complementary bit lines BLB11 to BLB1n included in the first reference mat RMAT1. Here, the first to n-th bit lines BL11 to BL1n may correspond to the first to n-th complementary bit lines BLB11 to BLB1n. For example, the first sense amplifier SA1 may perform a write operation or a read operation on the memory cells connected to the first to n-th bit lines BL11 to BL1n by using the sensed results from the first to n-th complementary bit lines BLB11 to BLB1n.

The first to n-th bit lines BL11 to BL1n and the first to n-th complementary bit lines BLB11 to BLB1n connected to the first sense amplifier SA1 may have an open bit line structure, and may not have a folded bit line structure. An open bit line structure may provide improvement in sensing margins.

In addition, the second sense amplifier SA2 may be connected to all of the first to n-th bit lines BL21 to BL2n included in the first normal mat NMAT1 and the first to n-th complementary bit lines BLB21 to BLB2n included in the first reference mat RMAT1. Here, the first to n-th bit lines BL21 to BL2n may correspond to the first to n-th complementary bit lines BLB21 to BLB2n. For example, the second sense amplifier SA2 may perform a write operation and/or a read operation on the memory cells connected to the first to n-th bit lines BL21 to BL2n by using the sensed results from the first to n-th complementary bit lines BLB21 to BLB2n.

The first to n-th bit lines BL21 to BL2n and the first to n-th complementary bit lines BLB21 to BLB2n connected to the second sense amplifier SA2 may have an open bit line structure.

Referring to FIG. 7, the first sub sense amplifier SA11 may be connected to both the first bit line BL11 and the first complementary bit line BLB11. Here, the first sub sense amplifier SA11 may be included in the first sense amplifier SA1, the first bit line BL11 may be included in the first normal mat NMAT1, and the first complementary bit line BLB11 may be included in the first reference mat RMAT1.

A first memory cell MC1 may be connected to both the first bit line BL11 and a first word line WL1, and may be positioned at an intersection of the first bit line BL11 and the first word line WL1. The first memory cell MC1 may include a first transistor TR1 and a storage element such as a first capacitor C1 and/or a first memristor. The first memory cell MC1 may be a one transistor, one capacitor ("1T1C") memory cell; however, example embodiments are not limited thereto. The first memory cell MC1 may perform a read and/or write operation by the first capacitor C1 being charged and/or discharged by the first sub sense amplifier SA11. A first memory cell MC1' may be connected to both the first complementary bit line BLB11 and a first word line WL1', and may be positioned at an intersection of the first complementary bit line BLB11 and the first word line WL1'. The first memory cell MC1' may include a first transistor TR1' and a first capacitor C1'. The first memory cell MC1' may correspond to a memory cell referred to when the first sub sense amplifier SA11 performs the read or write operation on the first memory cell MC1. For example, the first memory cell MC1' may correspond to a complementary relationship to the first memory cell MC1. In addition, the first complementary bit line BLB11 may correspond to a complementary relationship to the first bit line BL11. Here, the first memory cell MC1' may be positioned to be spaced apart from the first memory cell MC1 in the third direction Z.

Referring to FIGS. 6, 8, and 9, the first sense amplifier SA1 may be positioned at the first edge portion EDG1. The first sense amplifier SA1 may be disposed adjacent to the column decoder 170 and may extend along the column decoder 170. The first to n-th bit lines BL11 to BL1n and the first to n-th complementary bit lines BLB11 to BLB1n connected to the first sense amplifier SA1 may extend in the first direction X in parallel to each other. The first to n-th bit lines BL21 to BL2n and the first to n-th complementary bit lines BLB21 to BLB2n connected to the second sense amplifier SA2 may extend in the first direction X in parallel to each other. The first to n-th complementary bit lines BLB11 to BLB1n may overlap the first to n-th bit lines BL11 to BL1n, and the first to n-th complementary bit lines BLB21 to BLB2n may overlap the first to n-th bit lines BL21 to BL2n, but example embodiment are not limited thereto.

A memory device having an existing open bit line structure has bit lines and complementary bit lines that are connected to the sense amplifier and extend in the first direction X and a direction opposite to the first direction X. In this case, a portion corresponding to an outer portion of the bank memory array, such as the first edge portion EDG1, may correspond to a dummy mat including bit lines or complementary bit lines that are not matched. For example, the memory device having the existing open bit line structure may have the dummy mat at the first edge portion EDG1 or the second edge portion EDG2.

However, the memory device 100 according to various example embodiments may include the first to n-th bit lines BL11 to BL1n connected to the first sense amplifier SA1 and extending in the first direction X, and may include the first to n-th complementary bit lines BLB11 to BLB1n connected through the first to n-th metal lines ML11 to ML1n extending in the third direction Z. and extending in the first direction X. Accordingly, the memory device 100 according to various example embodiments has a multi-stack, or two-stack structure including the first normal mat NMAT1 and the first reference mat RMAT1, and thus does not have a dummy mat. For example, the memory device 100 including the first and second sense amplifiers SA1 and SA2 and the first normal mat NMAT1 disposed on the first layer, and the first reference mat RMAT1 disposed on the second layer does not have the dummy mat, thereby making it possible to reduce consumption of an unnecessary area. Accordingly, an area occupied by the memory device 100 in a memory chip may be further reduced.

Alternatively or additionally, since the memory device 100 has the two-stack structure of the first normal mat NMAT1 and the first reference mat RMAT1, more memory cells may be disposed in the same area. Accordingly, the memory device 100 having an increased cell density than a conventional cell density may be provided.

Figure 10:
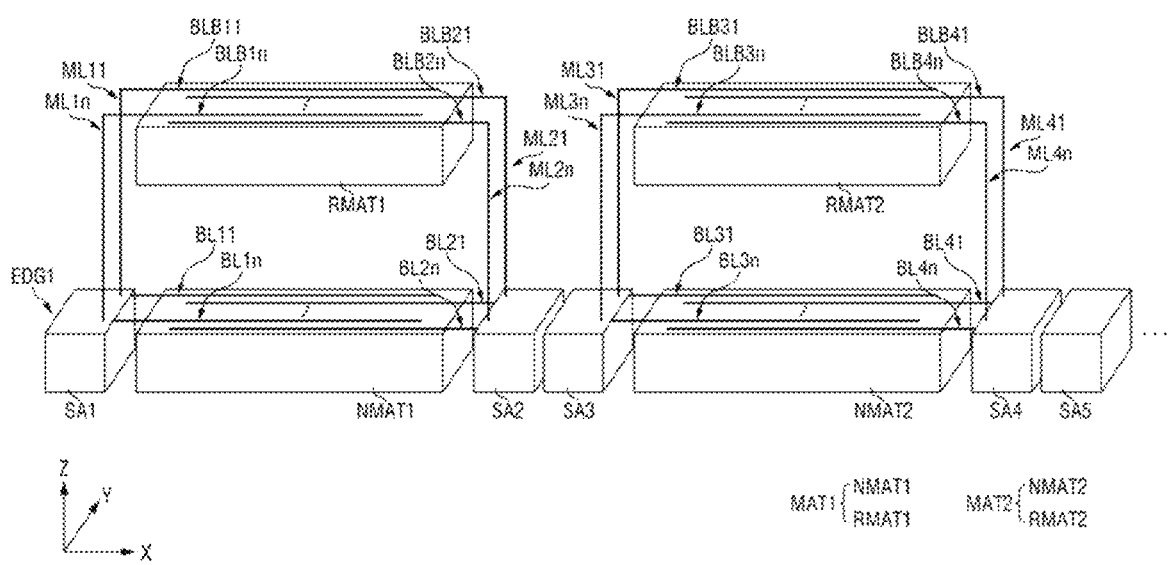
FIG. 10 is a three-dimensional view of the memory device according to some example embodiments.

FIG. 10 is a three-dimensional view of the memory device according to some example embodiments.

Referring to FIG. 10, the memory device 100 may further include a third sense amplifier SA3, a fourth sense amplifier SA4, a fifth sense amplifier SA5, a second normal mat NMAT2, and a second reference mat RMAT2. Here, the third sense amplifier SA3, the fourth sense amplifier SA4, the fifth sense amplifier SA5, the second normal mat NMAT2, and the second reference mat RMAT2 may be disposed to be spaced apart from the first sense amplifier SA1, the second sense amplifier SA2, the first normal mat NMAT1, and the first reference mat RMAT1 in the first direction X. The second mat MAT2 of FIG. 4 may include the second normal mat NMAT2 and the second reference mat RMAT2 of FIG. 10. For example, the second mat MAT2 may have a two-stack structure like the first mat MAT1.

The third sense amplifier SA3 may be spaced apart from the second sense amplifier SA2 in the first direction X. The fourth sense amplifier SA4 may be spaced apart from the third sense amplifier SA3 in the first direction X. The fifth sense amplifier SA5 may be spaced apart from the fourth sense amplifier SA4 in the first direction X. The second normal mat NMAT2 may be disposed between the third sense amplifier SA3 and the fourth sense amplifier SA4. In addition, the second reference mat RMAT2 may be spaced apart from the second normal mat NMAT2 in the third direction Z. For example, the second reference mat RMAT2 may be positioned above the second normal mat NMAT2.

The third to fifth sense amplifiers SA3 to SA5 and the second normal mat NMAT2 may be disposed on a first layer on which the first normal mat NMAT1 is positioned, and the second reference mat RMAT2 may be disposed on a second layer on which the first reference mat RMAT1 is positioned.

The second normal mat NMAT2 may include first to n-th bit lines BL31 to BL3n and first to n-th bit lines BL41 to BL4n extending in the first direction X. The second normal mat NMAT2 may include word lines intersecting the first to n-th bit lines BL31 to BL3n and the first to n-th bit lines BL41 to BL4n.

The second reference mat RMAT2 may include first to n-th complementary bit lines BLB31 to BLB3n and first to n-th complementary bit lines BLB41 to BLB4n extending in the first direction X. In addition, the second reference mat RMAT2 may include word lines intersecting the first to n-th complementary bit lines BLB31 to BLB3n and the first to n-th complementary bit lines BLB41 to BLB4n.

First to n-th metal lines ML31 to ML3n may extend in the third direction Z, and may connect the first to n-th bit lines BL31 to BL3n and the first to n-th complementary bit lines BLB31 to BLB3n. First to n-th metal lines ML41 to ML4n may extend in the third direction Z, and may connect the first to n-th bit lines BL41 to BL4n and the first to n-th complementary bit lines BLB41 to BLB4n.

The first to n-th bit lines BL31 to BL3n may correspond to the first to n-th complementary bit lines BLB31 to BLB3n, and the first to n-th bit lines BL41 to BL4n may correspond to the first to n-th complementary bit lines BLB41 to BLB4n. Since the memory device 100 of FIG. 10 includes the first mat MAT1 and the second mat MAT2 corresponding to two stacks, the area thereof may be further reduced and the cell density thereof may be increased.

FIG. 1I is a three-dimensional view of the memory device according to some example embodiments.

Figure 11:
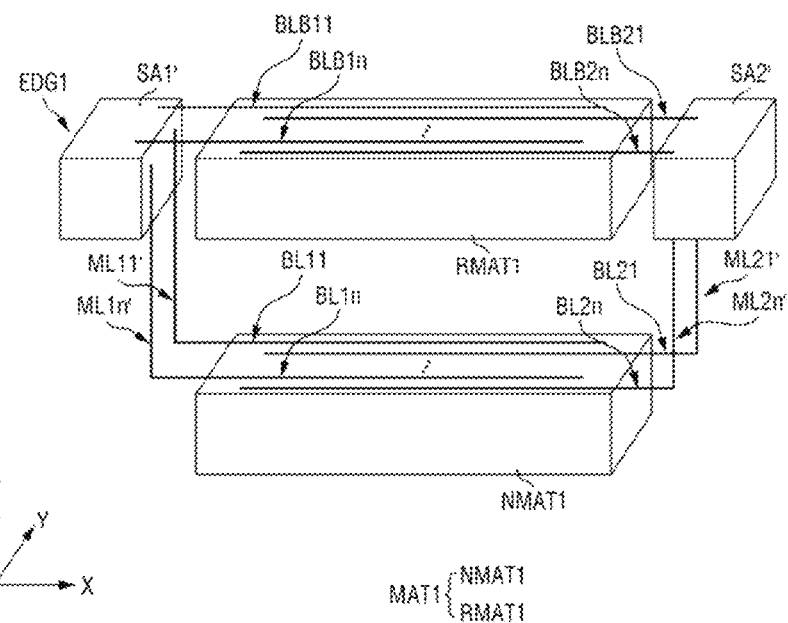
FIG. 11 is a three-dimensional view of the memory device according to some example embodiments.

Referring to FIG. 11, the memory device 100 may include a first normal mat NMAT1, a first reference mat RMAT1, a first sense amplifier SA1', and a second sense amplifier SA2'. Here, the first normal mat NMAT1 may be positioned on the first layer, and the first sense amplifier SA1', the second sense amplifier SA2', and the first reference mat RMAT1 may be positioned on the second layer.

The first reference mat RMAT1 may be positioned above the first normal mat NMAT1. For example, the first reference mat RMAT1 may be spaced apart from the first normal mat NMAT1 in the third direction Z. The first reference mat RMAT1 may be disposed between the first sense amplifier SA1' and the second sense amplifier SA2'.

The first to n-th complementary bit lines BLB11 to BLB1n included in the first reference mat RMAT1 may be connected or directly connected to the first sense amplifier SA1', and the first to n-th complementary bit lines BLB21 to BLB2n may be directly connected to the second sense amplifier SA2'. The first to n-th bit lines BL11 to BL1n included in the first normal mat NMAT1 may be connected to the first sense amplifier SA1' through first to n-th metal lines ML11' to ML1n'. Here, the first to n-th metal lines ML11' to ML1n' may extend in the third direction Z. The first to n-th bit lines BL21 to BL2n included in the first normal mat NMAT1 may be connected to the second sense amplifier SA2' through first to n-th metal lines ML21' to ML2n'. Here, the first to n-th metal lines ML21' to ML2n' may extend in the third direction Z.

Figure 12:
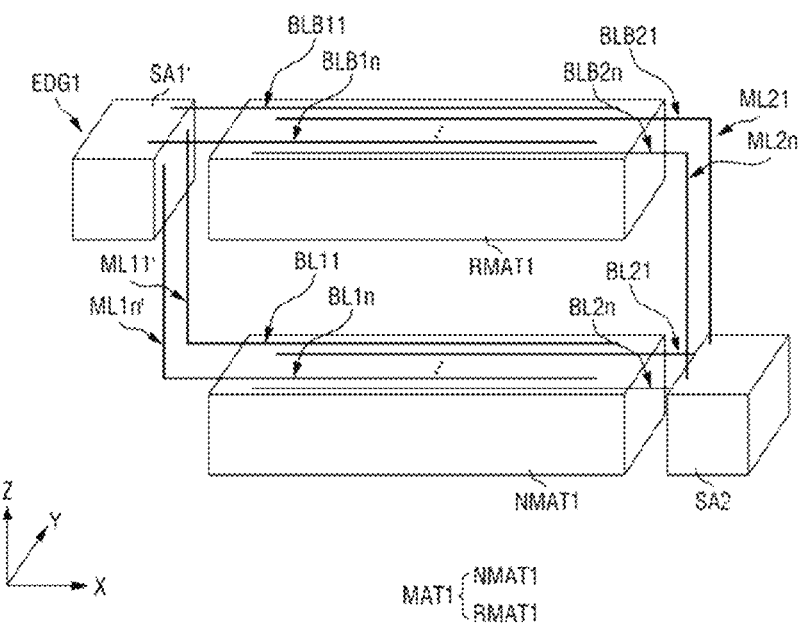
FIG. 12 is a three-dimensional view of the memory device according to some example embodiments.

FIG. 12 is a three-dimensional view of the memory device according to some example embodiments.

Referring to FIG. 12, the memory device 100 may include a first normal mat NMAT1, a first reference mat RMAT1, a first sense amplifier SA1', and a second sense amplifier SA2. Here, the first normal mat NMAT1 and the second sense amplifier SA2 may be positioned on the first layer, and the first sense amplifier SA1' and the first reference mat RMAT1 may be positioned on the second layer.

The first to n-th complementary bit lines BLB11 to BLB1n included in the first reference mat RMAT1 may be directly connected to the first sense amplifier SA1'. The first to n-th bit lines BL21 to BL2n included in the first normal mat NMAT1 may be directly connected to the second sense amplifier SA2. The first to n-th complementary bit lines BLB21 to BLB2n included in the first reference mat RMAT1 may be connected to the second sense amplifier SA2 through the first to n-th metal lines ML21 to ML2n. Here, the first to n-th metal lines ML21 to ML2n may extend in the third direction Z. The first to n-th bit lines BL11 to BL1n included in the first normal mat NMAT1 may be connected to the first sense amplifier SA1' through first to n-th metal lines ML11' to ML1n'. Here, the first to n-th metal lines ML11' to ML1n' may extend in the third direction Z.

Figure 13:
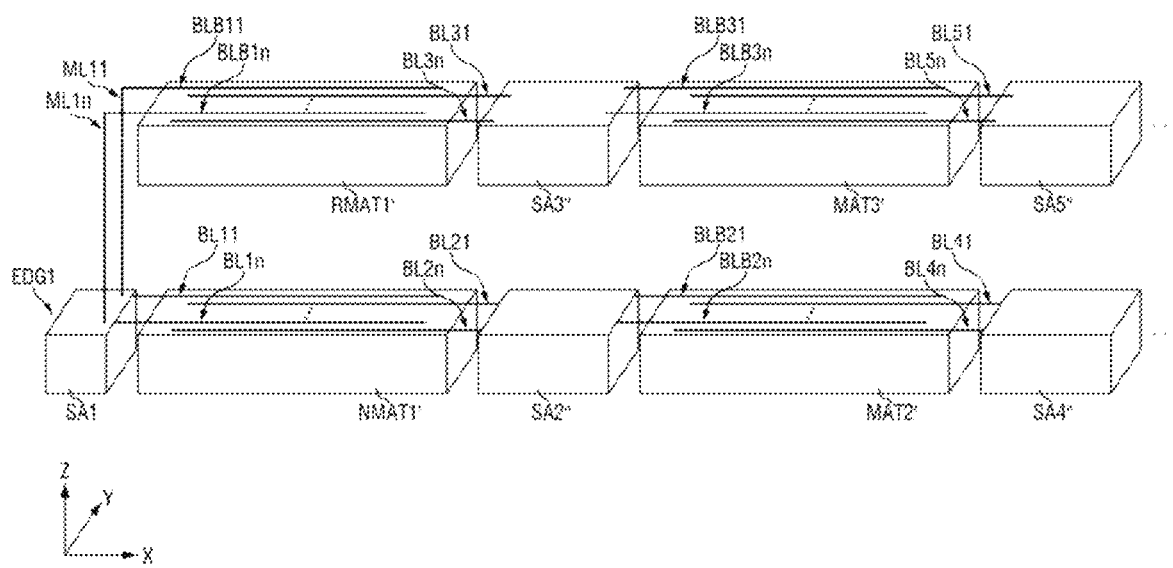
FIG. 13 is a three-dimensional view of the memory device according to some example embodiments.

FIG. 13 is a three-dimensional view of the memory device according to some example embodiments.

Referring to FIG. 13, the memory device 100 may include a first sense amplifier SA1 disposed at a first edge portion EDG1, and a first normal mat NMAT1', a second sense amplifier SA2", a second mat MAT2', and a fourth sense amplifier SA4" sequentially arranged in the first direction X from the first edge portion EDG1. In addition, the memory device 100 may include a first reference mat RMAT1' disposed above the first normal mat NMAT1'. The memory device 100 may include a third sense amplifier SA3", a third mat MAT3', and a fifth sense amplifier SA5 sequentially arranged in the first direction X from the first reference mat RMAT1'.

The first normal mat NMAT1' may include first to n-th bit lines BL11 to BL1n connected to the first sense amplifier SA1 and first to n-th bit lines BL21 to BL2n connected to the second sense amplifier SA2". The second mat MAT2' may include first to n-th complementary bit lines BLB2l to BLB2n connected to the second sense amplifier SA2" and first to n-th bit lines BL41 to BL4n connected to the fourth sense amplifier SA4".

The first reference mat RMAT1' may include first to n-th complementary bit lines BLB11 to BLB1n connected to the first sense amplifier SA1 and first to n-th bit lines BL31 to BL3n connected to the third sense amplifier SA3" through the first to n-th metal lines ML11 to ML1n. The third mat MAT3' may include first to n-th complementary bit lines BLB31 to BLB3n connected to the third sense amplifier SA3" and first to n-th bit lines BL51 to BL5n connected to the fifth sense amplifier SA5".

Here, the first sense amplifier SA1 may perform a read or write operation on the memory cells connected to the first to n-th bit lines BL11 to BL1n by using the first to n-th complementary bit lines BLB11 to BLB1n. The second sense amplifier SA2" may perform a read or write operation on the memory cells connected to the first to n-th bit lines BL21 to BL2n by using the first to n-th complementary bit lines BLB21 to BLB2n. The third sense amplifier SA3" may perform a read or write operation on the memory cells connected to the first to n-th complementary bit lines BL31 to BL3n by using the first to n-th complementary bit lines BLB31 to BLB3n.

For example, the first to n-th bit lines BL11 to BL1n and the first to n-th complementary bit lines BLB11 to BLB1n connected to the first sense amplifier SA1 corresponding to the first edge portion EDG1 may be vertically connected through the first to n-th metal lines ML11 to ML1n, and each bit line and each complementary bit line may be disposed in two stacks. Accordingly, the dummy mat corresponding to the first edge portion EDG1 is removed, so that the memory device 100 having a smaller area may be provided. In addition, mats corresponding to portions other than the first edge portion EDG1 or the second edge portion EDG2 are also disposed in two stacks in an open bit line structure, so that the memory device 100 having an increased cell density may be provided.

Hereinafter, the memory device 100 according to some other example embodiments will be described with reference to FIG. 14.

Figure 14:
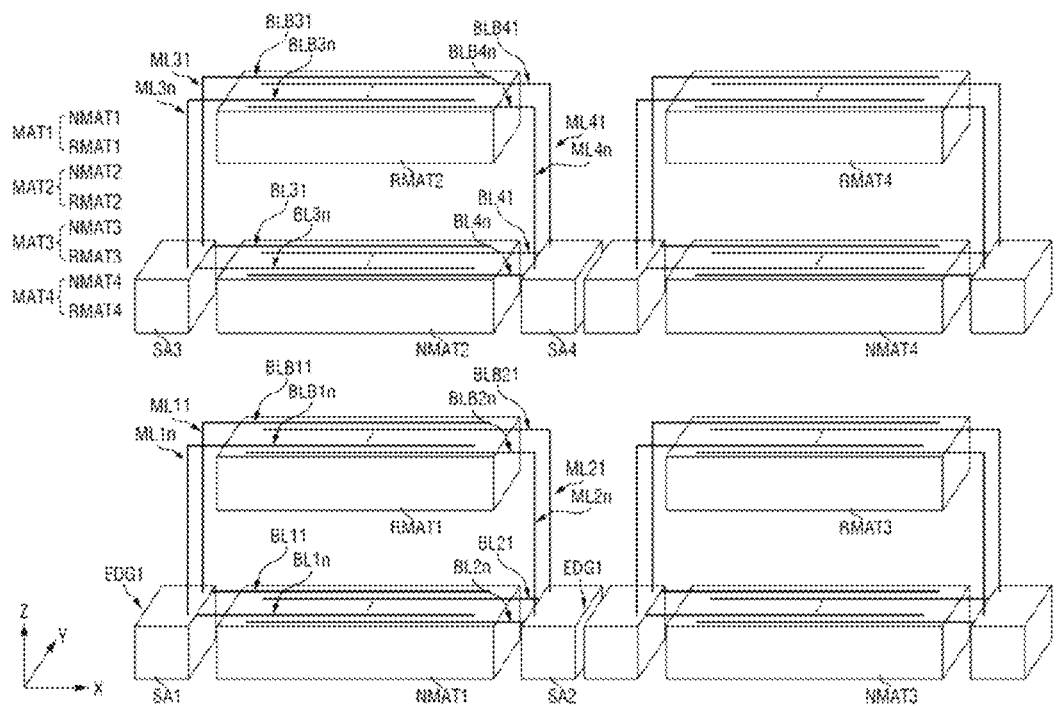
FIG. 14 is a three-dimensional view of the memory device according to some example embodiments.

FIG. 14 is a three-dimensional view of the memory device according to some example embodiments. For convenience of explanation, portions overlapping those described above with reference to FIGS. 1 to 9 will be briefly described or a description thereof will be omitted.

Referring to FIG. 14, the memory device 100 may further include a third sense amplifier SA3, a fourth sense amplifier SA4, a second normal mat NMAT2, and a second reference mat RMAT2. Here, the third sense amplifier SA3, the fourth sense amplifier SA4, the second normal mat NMAT2, and the second reference mat RMAT2 may be disposed above the first sense amplifier SA1, the second sense amplifier SA2, the first normal mat NMAT1, and the first reference mat RMAT1.

For example, the first sense amplifier SA1, the second sense amplifier SA2, and the first normal mat NMAT1 may be disposed on a first layer, the first reference mat RMAT1 may be disposed on a second layer, the third sense amplifier SA3, the fourth sense amplifier SA4, and the second normal mat NMAT2 may be disposed on a third layer, and the second reference mat RMAT2 may be disposed on a fourth layer. For example, the memory device 100 may have a four-stack memory structure.

The second normal mat NMAT2 may include first to n-th bit lines BL31 to BL3n connected to the third sense amplifier SA3, and may include first to n-th bit lines BL41 to BL4n connected to the fourth sense amplifier SA4. The second reference mat RMAT2 may include first to n-th complementary bit lines BLB31 to BLB3n connected to the third sense amplifier SA3 through the first to n-th metal lines ML31 to ML3n, and may include first to n-th complementary bit lines BLB41 to BLB4n connected to the fourth sense amplifier SA4 through the first to n-th metal lines ML41 to ML4n.

The third mat MAT3 may include a third normal mat NMAT3 and a third reference mat RMAT3. The third mat MAT3 may be disposed to be spaced apart from the first mat MAT1 in the first direction X. The fourth mat MAT4 may include a fourth normal mat NMAT4 and a fourth reference mat RMAT4. The fourth mat MAT4 may be disposed to be spaced apart from the second mat MAT2 in the first direction X. In addition, the fourth mat MAT4 may be disposed to be spaced apart from the third mat MAT3 in the third direction Z.

In the third direction Z, the first normal mat NMAT1, the first reference mat RMAT1, the second normal mat NMAT2, and the second reference mat RMAT2 are sequentially arranged, and the third normal mat NMAT3, the third reference mat RMAT3, the fourth normal mat NMAT4, and the fourth reference mat RMAT4 are sequentially arranged, thereby making it possible to provide a four-stack memory device 100 having improved cell density.

Hereinafter, the memory device 100 according to some other example embodiments will be described with reference to FIG. 15.

Figure 15:
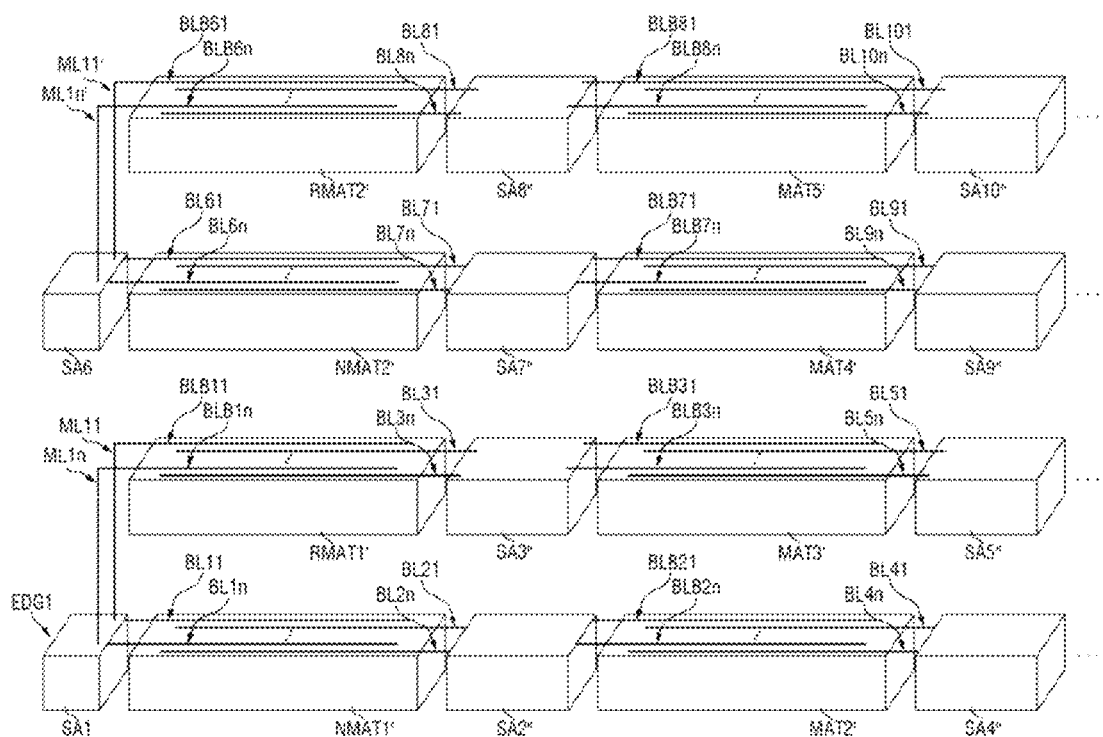
FIG. 15 is a three-dimensional view of the memory device according to some example embodiments.

FIG. 15 is a three-dimensional view of the memory device according to some example embodiments. For convenience of explanation, portions overlapping those described above with reference to FIGS. 1 to 9 and 13 will be briefly described or a description thereof will be omitted.

Referring to FIG. 15, the memory device 100 may further include a sixth sense amplifier SA6, a seventh sense amplifier SA7''', an eighth sense amplifier SA8'', a ninth sense amplifier SA9'', a tenth sense amplifier SA10'', a second normal mat NMAT2', a second reference mat RMAT2', a fourth mat MAT4', and a fifth mat MAT5'.

Here, the sixth sense amplifier SA6, the seventh sense amplifier SA7'', the eighth sense amplifier SA8'', the ninth sense amplifier SA9'', the tenth sense amplifier SA10'', the second normal mat NMAT2', the second reference mat RMAT2', the fourth mat MAT4', and the fifth mat MAT5' may be disposed above the first sense amplifier SA1, the second to fifth sense amplifiers SA2'' to SA5'', the first normal mat NMAT1', the first reference mat RMAT1', the second mat MAT2', and the third mat MAT3'. That is, the memory device 100 having a four-stack memory structure may be provided.

The second normal mat NMAT2' may include first to n-th bit lines BL61 to BL6n connected to the sixth sense amplifier SA6 and first to n-th bit lines BL71 to BL7n connected to the seventh sense amplifier SA7''. The second reference mat RMAT2' may include first to n-th complementary bit lines BLB61 to BLB6n connected to the sixth sense amplifier SA6 through the first to n-th metal lines ML11' to ML1n', and may include first to n-th bit lines BL81 to BL8n connected to the eighth sense amplifier SA8''.

The fourth mat MAT4' may include first to n-th complementary bit lines BLB71 to BLB7n connected to the seventh sense amplifier SA7'' and first to n-th bit lines BL91 to BL9n connected to the ninth sense amplifier SA9''. The fifth mat MAT5' may include first to n-th complementary bit lines BLB81 to BLB8n connected to the eighth sense amplifier SA8'' and first to n-th complementary bit lines BL101 to BL10n connected to the tenth sense amplifier SA10''.

Accordingly, the memory device 100 having an increased cell density by having the bit lines and the complementary bit lines vertically connected to the first edge portion EDG1 and having the 4-stack memory structure may be provided.

Figure 16:
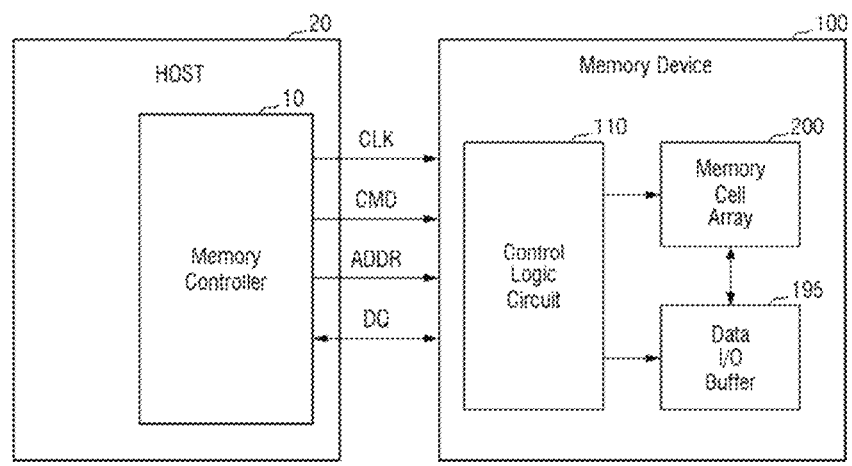
FIG. 16 is a block diagram illustrating a memory system according to some example embodiments.

FIG. 16 is a block diagram illustrating a memory system according to some example embodiments.

Referring to FIG. 16, a host device 20 may include a memory controller 10. That is, unlike the memory system described with reference to FIG. 1 in which the memory controller 10 is positioned outside the host device 20, the host device 20 according to example embodiments may include the memory controller 10. The host device 20 may control the memory device 100 through the memory controller 10. Here, the host device 20 may communicate with the memory device 100 based on one or more of the standards such as double data rate (DDR), low power double data rate (LPDDR), graphics double data rate (GDDR), wide I/O, high bandwidth memory (HBM), hybrid memory cube (HMC), or compute eXpress link (CXL).

Figure 17:
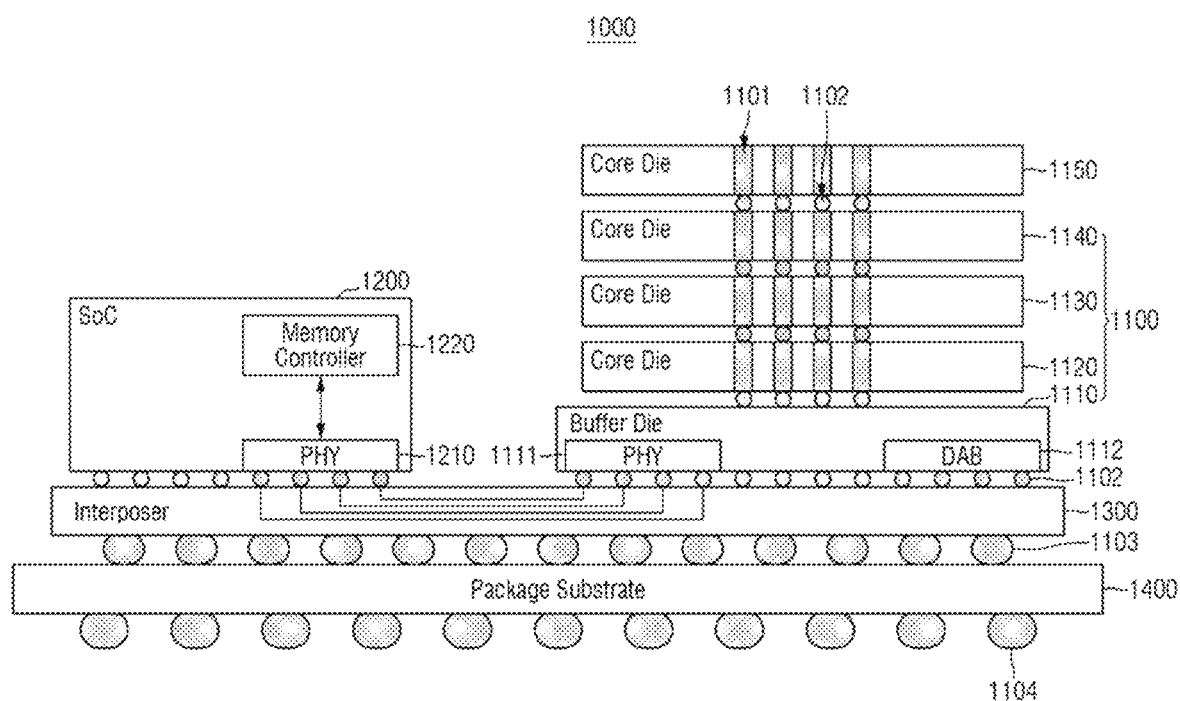
FIG. 17 is a diagram of a semiconductor package according to some example embodiments.

FIG. 17 is a diagram of a semiconductor package according to some example embodiments.

Referring to FIG. 17, a semiconductor package 1000 may include a stacked memory device 1100, a system on chip 1200, an interposer 1300, and a package substrate 1400. The stacked memory device 1100 may include a buffer die 1110 and core dies 1120 to 1150.

Each of the core dies 1120 to 1150 may include a memory cell array. The core dies 1120 to 1150 may include the memory device 100 described with reference to FIGS. 1 to 16. The buffer die 1110 may include a physical layer 1111 and a direct access area (DAB) 1112. The physical layer 1111 may be electrically connected to a physical layer 1210 of the system on chip 1200 through the interposer 1300. The stacked memory device 1100 may receive signals from the system on chip 1200 or transmit signals to the system on chip 1200 through the physical layer 1111.

The direct access area 1112 may provide an access path capable of testing the stacked memory device 1100 without passing through the system on chip 1200. The direct access area 1112 may include conductive means (e.g., ports or pins) that may directly communicate with an external test device. The test signal and data received through the direct access area 1112 may be transmitted to the core dies 1120 to 1150 through or by through silicon vias (TSVs). For testing of the core dies 1120 to 1150, data read from the core dies 1120 to 1150 may be transmitted to the test device through the TSVs and the direct access area 1112. Accordingly, a direct access test for the core dies 1120 to 1150 may be performed.

The buffer die 1110 and the core dies 1120 to 1150 may be electrically connected to each other through TSVs 1101 and bumps 1102. The buffer die 1110 may receive signals provided to each channel through the bumps 1102 allocated for each channel from the system on chip 1200. For example, the bumps 1102 may be micro-bumps.

The system on chip 1200 may execute applications supported by the semiconductor package 1000 by using the stacked memory device 1100. For example, the system on chip 1200 may execute specialized operations by including at least one processor of a central processing unit (CPU), an application processor (AP), a graphic processing unit (GPU), a neural processing unit (NPU), a tensor processing unit (TPU), a vision processing unit (VPU), an image signal processor (ISP), and a digital signal processor (DSP).

The system on chip 1200 may include a physical layer 1210 and a memory controller 1220. The physical layer 1210 may include input/output circuits for transmitting and receiving signals to and from the physical layer 1111 of the stacked memory device 1100. The system on chip 1200 may provide various signals to the physical layer 1111 through the physical layer 1210. The signals provided to the physical layer 1111 may be transmitted to the core dies 1120 to 1150 through interface circuits of the physical layer 1111 and the TSVs 1101.

The memory controller 1220 may control an overall operation of the stacked memory device 1100. The memory controller 1220 may transmit signals for controlling the stacked memory device 1100 to the stacked memory device 1100 through the physical layer 1210.

The memory controller 1220 may correspond to the memory controller 10 of FIG. 1.

The interposer 1300 may connect the stacked memory device 1100) and the system on chip 1200. The interposer 1300 may connect the physical layer 1111 of the stacked memory device 1100 and the physical layer 1210 of the system on chip 1200 and provide physical paths formed using conductive materials. Accordingly, the stacked memory device 1100 and the system on chip 1200 may be stacked on the interposer 1300 to transmit and receive signals to and from each other.

Bumps 1103 may be attached to an upper portion of the package substrate 1400, and solder balls 1104 may be attached to a lower portion of the package substrate 1400. For example, the bumps 1103 may be flip-chip bumps. The interposer 1300 may be stacked on the package substrate 1400 through bumps 1103. The semiconductor package 1000 may transmit and receive signals to and from other external packages or semiconductor devices through the solder balls 1104. For example, the package substrate 1400 may be a printed circuit board (PCB).

Figure 18:
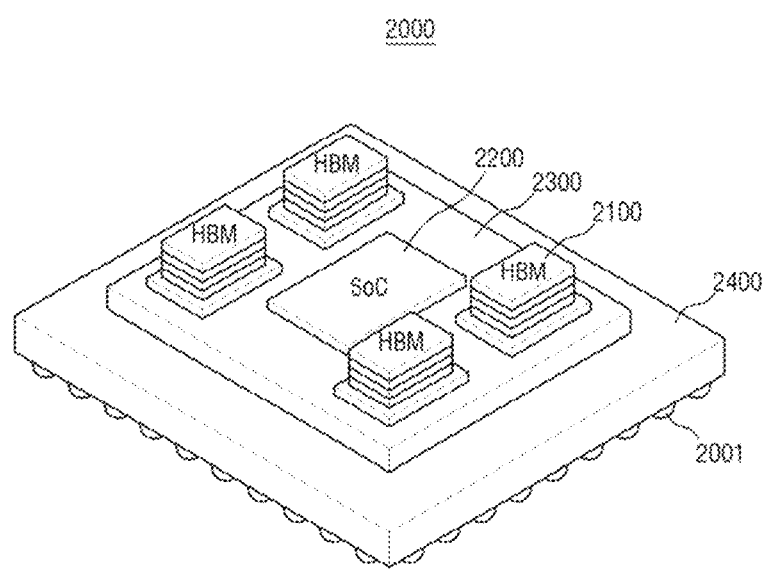
FIG. 18 is a diagram illustrating an example of implementation of a semiconductor package according to some example embodiments.

FIG. 18 is a diagram illustrating an example of implementation of a semiconductor package according to some example embodiments.

Referring to FIG. 18, a semiconductor package 2000 may include a plurality of stacked memory devices 2100 and a system on chip 2200. The stacked memory devices 2100 and the system on chip 2200 may be stacked on an interposer 2300, and the interposer 2300 may be stacked on a package substrate 2400. The semiconductor package 2000 may transmit and receive signals to and from other external packages or semiconductor devices through solder balls 2001 attached to a lower portion of the package substrate 2400.

Each of the stacked memory devices 2100 may be implemented based on the high bandwidth memory (HBM) standard. However, example embodiments are not limited thereto, and each of the stacked memory devices 2100 may be implemented based on one or more of the GDDR, HMC, or Wide I/O standard. Each of, or at least some of, the stacked memory devices 2100 may correspond to the stacked memory device 1100 of FIG. 17.

The system on chip 2200 may include at least one processor such as a CPU, an AP, a GPU, or an NPU and a plurality of memory controllers for controlling the plurality of stacked memory devices 2100. The system on chip 2200 may transmit and receive signals to and from a corresponding stacked memory device through the memory controller. The system on chip 2200 may correspond to the system on chip 1200 of FIG. 17.

Figure 19:
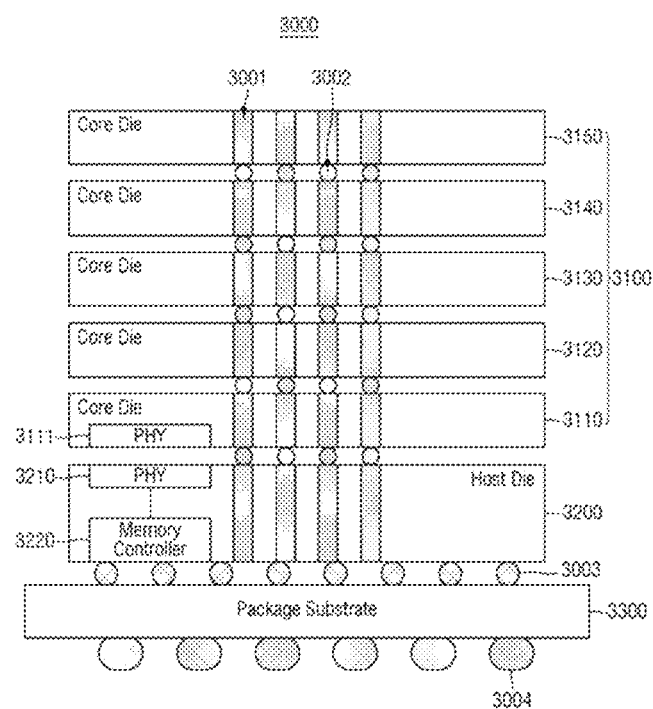
FIG. 19 is a diagram of a semiconductor package according to some example embodiments.

FIG. 19 is a diagram of a semiconductor package according to some example embodiments.

Referring to FIG. 19, a semiconductor package 3000 may include a stacked memory device 3100, a host die 3200, and a package substrate 3300. The stacked memory device 3100 may include a buffer die 3110 and core dies 3120 to 3150. The buffer die 3110 may include a physical layer 3111 for communicating with the host die 3200, and each of the core dies 3120 to 3150 may include a memory cell array.

The host die 3200 may include a physical layer 3210 for communicating with the stacked memory device 3100 and a memory controller 3220 for controlling an overall operation of the stacked memory device 3100. In addition, the host die 3200 may include a processor for controlling an overall operation of the semiconductor package 3000 and executing an application supported by the semiconductor package 3000. For example, the host die 3200 may include at least one processor such as a CPU, an AP, a GPU, or an NPU.

The stacked memory device 3100 may be disposed above the host die 3200 based on TSVs 3001 and vertically stacked above the host die 3200. Accordingly, the buffer die 3110, the core dies 3120 to 3150, and the host die 3200 may be electrically connected to each other through the TSVs 3001 and the bumps 3002 without an interposer. For example, the bumps 3002 may be micro-bumps.

Bumps 3003 may be attached to an upper portion of the package substrate 3300, and solder balls 3004 may be attached to a lower portion of the package substrate 33. For example, the bumps 3003 may be flip-chip bumps. The host die 3200 may be stacked on the package substrate 3300 through the bumps 3003. The semiconductor package 3000 may transmit and receive signals to and from other external packages or semiconductor devices through the solder balls 3004.

Example embodiments have been described hereinabove with reference to the accompanying drawings, but it will be understood by one of ordinary skill in the art to which the present disclosure pertains that various modifications and alterations may be made without departing from the technical spirit or essential feature of the present disclosure. Furthermore example embodiments are not necessarily mutually exclusive. For example, some example embodiments may include one or more features described with reference to one or more figures, and may also include one or more other features described with reference to one or more other figures. Therefore, it is to be understood that the example embodiments described above are illustrative rather than being restrictive in all aspects.

What is claimed is:

1. A memory device comprising:
a first sense amplifier;
a second sense amplifier spaced apart from the first sense amplifier;
a first normal mat between the first sense amplifier and the second sense amplifier, and including a first bit line connected to the first sense amplifier and a second bit line connected to the second sense amplifier; and
a first reference mat on the first normal mat between the first sense amplifier and the second sense amplifier, and including a first complementary bit line connected to the first sense amplifier and a second complementary bit line connected to the second sense amplifier.

2. The memory device of claim 1, wherein the first sense amplifier is configured to perform at least one of a read or write operation on a first memory cell connected to the first bit line by using the first complementary bit line, and
the second sense amplifier is configured to perform at least one of a read or write operation on a second memory cell connected to the second bit line by using the second complementary bit line.

3. The memory device of claim 1, wherein
the first bit line is parallel to the first complementary bit line, and
the second bit line is parallel to the second complementary bit line.

4. The memory device of claim 3, wherein
the first bit line, the second bit line, the first complementary bit line, and the second complementary bit line extend in a first direction,
the first bit line is spaced apart from the second bit line in a second direction intersecting the first direction, and
the first complementary bit line is spaced apart from the second complementary bit line in the second direction.

5. The memory device of claim 1, wherein the first complementary bit line is connected to the first sense amplifier through a first metal line, and the second complementary bit line is connected to the second sense amplifier through a second metal line.

6. The memory device of claim 1, wherein the first sense amplifier and the second sense amplifier are on a first layer on which the first normal mat is disposed, and the first reference mat is on a second layer above the first layer.

7. The memory device of claim 1, wherein the first normal mat is on a first layer, and the first sense amplifier, the second sense amplifier, and the first reference mat are on a second layer above the first layer.

8. The memory device of claim 1, wherein the first normal mat and the first sense amplifier are on a first layer, and the second sense amplifier and the first reference mat are on a second layer above the first layer.

9. The memory device of claim 1, further comprising:
a third sense amplifier spaced apart from the second sense amplifier;
a fourth sense amplifier spaced apart from the third sense amplifier;
a second normal mat between the third sense amplifier and the fourth sense amplifier, and including a third bit line connected to the third sense amplifier and a fourth bit line connected to the fourth sense amplifier; and
a second reference mat on the second normal mat between the third sense amplifier and the fourth sense amplifier, and including a third complementary bit line connected to the third sense amplifier and a fourth complementary bit line connected to the fourth sense amplifier.

10. The memory device of claim 9, wherein the first to fourth sense amplifiers are sequentially arranged in a first direction,
the first to fourth sense amplifiers, the first normal mat, and the second normal mat are on a first layer, and
the first reference mat and the second reference mat are on a second layer above the first layer.

11. The memory device of claim 9, wherein the first sense amplifier, the second sense amplifier, and the first normal mat are on a first layer,
the first reference mat is on a second layer above the first layer,
the third sense amplifier, the fourth sense amplifier, and the second normal mat are on a third layer above the second layer, and
the second reference mat is on a fourth layer above the third layer.

12. A memory device comprising:
a plurality of memory banks;
a row decoder having a first memory bank among the plurality of memory banks, the memory bank extending in a first direction;
a column decoder extending in a second direction intersecting the first direction;
a bank memory array arranged in the second direction from the row decoder and in the first direction from the column decoder; and
a first sense amplifier at a first edge portion of the bank memory array in a third direction intersecting the first direction,
wherein the bank memory array includes,
a first normal mat spaced apart from the first sense amplifier in the first direction and including a first bit line connected to the first sense amplifier, and
a first reference mat spaced apart from the first normal mat in the third direction, and including a first complementary bit line connected to the first sense amplifier.

13. The memory device of claim 12, further comprising:
a second sense amplifier at a second edge portion of the bank memory array in the first direction,
wherein the bank memory array includes,
a second normal mat spaced apart from the second sense amplifier in the third direction and including a second bit line connected to the second sense amplifier, and
a second reference mat spaced apart from the second normal mat in the third direction and including a second complementary bit line connected to the second sense amplifier.

14. The memory device of claim 13, further comprising:
a third sense amplifier disposed between the first edge portion and the second edge portion,
wherein the bank memory array includes,
a third bit line extending from the third sense amplifier in the third direction and connected to the third sense amplifier, and
a third complementary bit line extending from the third sense amplifier in the first direction and connected to the third sense amplifier.

15. The memory device of claim 14, wherein,
the first sense amplifier is configured to perform a read and/or write operation on a first memory cell connected to the first bit line by using the first complementary bit line,
the second sense amplifier performs a read or write operation on a second memory cell connected to the second bit line by using the second complementary bit line, and
the third sense amplifier performs a read or write operation on a third memory cell connected to the third bit line by using the third complementary bit line.

16. The memory device of claim 12, wherein the first bit line is parallel to the first complementary bit line.

17. The memory device of claim 12 wherein the first bit line and the first complementary bit line extend in the first direction.

18. The memory device of claim 12, wherein the first complementary bit line is connected to the first sense amplifier through a metal line.

19. The memory device of claim 12, wherein the first sense amplifier is on a first layer on which the first normal mat is disposed, and the first reference mat is on a second layer above the first layer.

20. The memory device of claim 12, wherein the first normal mat is on a first layer, and the first sense amplifier and the first reference mat are on a second layer above the first layer.

* * * * *